US010672188B2

(12) United States Patent
Bleyer et al.

(10) Patent No.: US 10,672,188 B2
(45) Date of Patent: Jun. 2, 2020

(54) SURFACE RECONSTRUCTION FOR ENVIRONMENTS WITH MOVING OBJECTS

(71) Applicant: MICROSOFT TECHNOLOGY LICENSING, LLC, Redmond, WA (US)

(72) Inventors: Michael Bleyer, Seattle, WA (US); Yuri Pekelny, Seattle, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1 day.

(21) Appl. No.: 15/957,462

(22) Filed: Apr. 19, 2018

(65) Prior Publication Data

US 2019/0325644 A1 Oct. 24, 2019

(51) Int. Cl.
*G06T 17/20* (2006.01)
*G06T 15/20* (2011.01)
*G06T 15/00* (2011.01)

(52) U.S. Cl.
CPC ............ *G06T 17/20* (2013.01); *G06T 15/005* (2013.01); *G06T 15/205* (2013.01)

(58) Field of Classification Search
CPC ...... G06T 17/20; G06T 15/005; G06T 15/205
See application file for complete search history.

(56) References Cited

U.S. PATENT DOCUMENTS

| 9,242,171 B2* | 1/2016 | Newcombe | A63F 13/06 |
| 2011/0025689 A1* | 2/2011 | Perez | A63F 13/213 |
| | | | 345/420 |
| 2011/0249190 A1* | 10/2011 | Nguyen | H04N 5/272 |
| | | | 348/708 |
| 2011/0293180 A1* | 12/2011 | Criminisi | G06K 9/38 |
| | | | 382/173 |
| 2012/0242794 A1* | 9/2012 | Park | G06K 9/32 |
| | | | 348/46 |
| 2014/0055560 A1* | 2/2014 | Fu | G06T 5/005 |
| | | | 348/42 |
| 2014/0225820 A1* | 8/2014 | Schwesinger | G06F 3/011 |
| | | | 345/156 |

(Continued)

OTHER PUBLICATIONS

Izadi, Shahram, et al. "KinectFusion: real-time 3D reconstruction and interaction using a moving depth camera." Proceedings of the 24th annual ACM symposium on User interface software and technology. ACM, 2011. (Year: 2011).*

(Continued)

*Primary Examiner* — Yu Chen
(74) *Attorney, Agent, or Firm* — Workman Nydegger

(57) ABSTRACT

Optimizations are provided for reconstructing geometric surfaces for an environment that includes moving objects. Multiple depth maps for the environment are created, where some of the depth maps correspond to different perspectives of the environment. A motion state identifier is assigned to at least some pixels in at least some of the depth maps corresponding to moving objects in the environment. A composite 3D mesh is built using at least some of the multiple depth maps, by incorporating pixel information from the depth maps, while omitting pixel information identified by the motion state identifiers as being associated with moving objects.

18 Claims, 14 Drawing Sheets

(56) References Cited

U.S. PATENT DOCUMENTS

2015/0138063 A1* 5/2015 Cao .................. G06F 3/0304
  345/156

OTHER PUBLICATIONS

Barsan, Ioan Andrei., "Simultaneous Localization and Mapping in Dynamic Scenes", In Master's thesis Submitted to Department of Computer Science, ETH Zurich, Aug. 27, 2017, 97 Pages.

"International Search Report and Written Opinion Issued in PCT Application No. PCT/US19/027113", dated Oct. 25, 2019, 16 Pages.

Shen, Shuhan, "Depth-Map Merging for Multi-View Stereo With High Resolution Images", In Proceedings of the 21st International Conference on Pattern Recognition, Nov. 11, 2012, pp. 788-791.

Yang, et al., "Robust RGB-D Slam in Dynamic Environment Using Faster R-CNN", In Proceedings of the 3rd IEEE International Conference on Computer and Communications (ICCC), Dec. 13, 2017, pp. 2398-2402.

Zhong, et al., "Detect-SLAM: Making Object Detection and SLAM Mutually Beneficial", In Proceedings of the IEEE Winter Conference on Applications of Computer Vision (WACV), Mar. 12, 2018, pp. 1001-1010.

\* cited by examiner

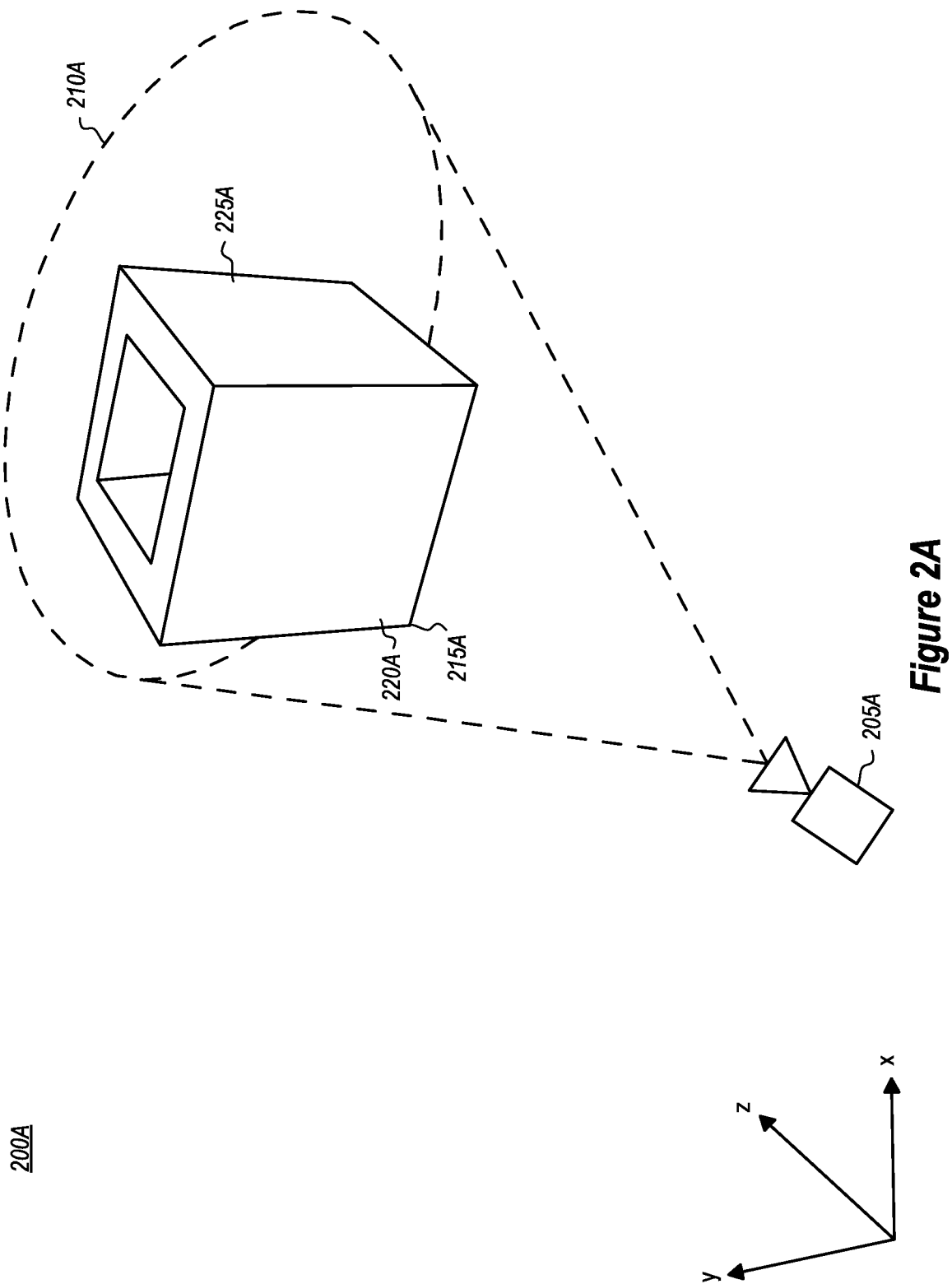

SURFACE RECONSTRUCTION FOR ENVIRONMENTS WITH MOVING OBJECTS

BACKGROUND

Mixed-reality systems, including virtual-reality (VR) and augmented-reality (AR) systems, have received significant attention because of their ability to create truly unique experiences for their users. For reference, conventional VR systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) include AR systems, VR systems, and/or any other similar system capable of displaying virtual objects.

Some of the disclosed mixed-reality systems use one or more on-body devices (e.g., the HMD, a handheld device, etc.). The HMD provides a display that enables a user to view overlapping and/or integrated visual information in whatever environment the user is in, be it a VR environment, an AR environment, or any other type of environment. Continued advances in hardware capabilities and rendering technologies have greatly improved how mixed-reality systems render objects. However, the process of immersing a user into a mixed-reality environment creates many challenges, difficulties, and costs, particularly with regard to accurately perceiving the surrounding environment and then sharing the perceived information with the user.

For instance, traditional techniques for reconstructing geometric surfaces include obtaining multiple images of an environment and then building depth maps using those images. The information in the depth maps is then fused together to generate a coherent three-dimensional (3D) depth mesh (or simply "depth mesh" or "3D mesh") that represents at least some of the geometric surfaces included within the environment.

While the above techniques work well for static environments, significant problems arise when objects are moving while the images are being formed. As an example, consider a scenario where a person is moving in a room. Because of the movements, each image will show the person at a different position and/or location in the room. Consequently, the depth maps will portray varying or non-uniform depths for the person. Because the overall 3D mesh is built by fusing together these depth maps, the 3D mesh will unfortunately include blurring effects (e.g., ghosting) for the person. That said, some techniques have been developed in an effort to resolve these problems. For instance, there is a technique referred to as a "clean up later" approach in which the processes described above are followed, thereby resulting in ghosting effects for any moving objects. As the name suggests, however, the clean up later approach causes different "post-processing" operations to be performed in an attempt to clean up or erase the ghosting effects from the 3D mesh.

While some techniques (e.g., the clean up later approach) have been developed in an effort to improve the quality of the 3D mesh, these techniques are (1) inefficient, (2) deficient, and (3) based on a false assumption. To illustrate, traditional techniques are (1) inefficient because post-processing operations are very resource intensive, (2) deficient because erasing content from the 3D mesh almost always lead to inaccuracies, and (3) based on a false assumption because they assume that perfectly accurate depth images are available. In real practice, however, perfectly accurate depth images are rarely, if ever, obtained. Accordingly, there is a significant need to improve how geometric surfaces are reconstructed.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

Disclosed embodiments are directed to systems and methods for reconstructing geometric surfaces in an environment, wherein the reconstruction process identifies moving objects and omits certain pixel data associated with the moving objects during the reconstruction. As one example, the environment may be an office that includes chairs, desks, computers, and humans. Humans (or hands, animals, or other highly transitory objects) are very dynamic whereas chairs, desks, and computers are often very static. The disclosed embodiments are able to accurately reconstruct the geometric surfaces of the office (including the chairs, desks, and computers), while omitting the reconstruction of the moving human in the environment, and which can eliminate certain undesired visual effects.

In some embodiments, a camera system captures images of an environment from multiple different angles. Multiple depth maps are then created using these images. Because the images were taken from different angles, the depth maps will also represent the environment from different angles. A motion state identifier is then assigned to each of at least some pixels in each of at least some of the depth maps. A motion state identifier identifies whether a pixel is associated with a dynamic object (even if that object did not move between consecutive images) or a static object (even if that object did move slightly between consecutive images). As an example, the motion state identifiers for pixels corresponding to the human may identify those pixels as corresponding to a dynamic object. In contrast, the motion state identifiers for pixels corresponding to the chairs, desks, and computers may identify those pixels as corresponding to static objects.

A composite 3D mesh is then generated based, at least partially, on the depth maps. According to some embodiments, information for pixels corresponding to the static objects in the depth maps is considered when building the 3D mesh while information for pixels corresponding to the dynamic objects in the depth maps is not considered when building the 3D mesh. As an example, pixel information (including depth information) corresponding to the human may not be added to the 3D mesh from the depth maps, while pixel information (including depth information) for the chairs, desks, and computers may be added to the 3D mesh from the depth maps. In this manner, the embodiments are able to reconstruct geometric surfaces in any type of environment, even environments that have dynamic, transitory, or moving objects.

In some embodiments, after the multiple depth maps are generated, then a particular set of pixels from within at least some of those depth maps are identified as being associated with certain predetermined motion criteria. Thereafter, the composite 3D mesh is built from at least some of the multiple depth maps by incorporating pixel information from these depth maps into the 3D mesh while also omitting information corresponding to the particular set of pixels that are associated with the predetermined motion criteria.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 2A and 2B illustrate how a camera system can be used to capture images of an environment from different perspectives.

FIG. 3 also show that the depth map includes depth information and motion state identifier information for at least some of the pixels in the depth map.

DETAILED DESCRIPTION

Figure 1:
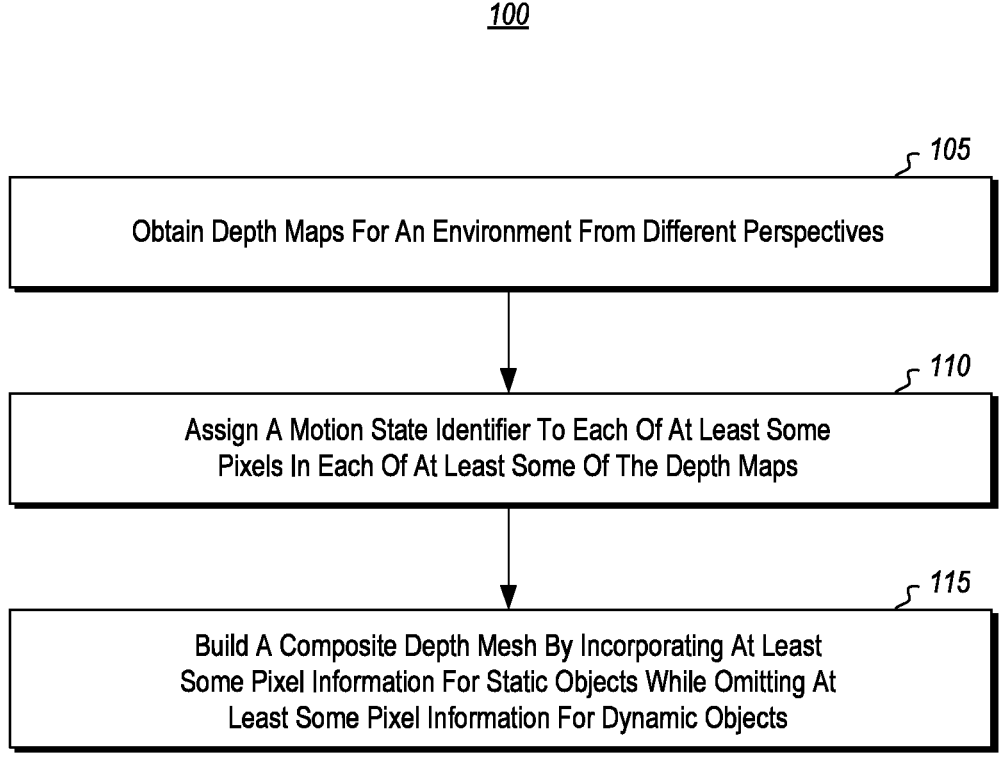
FIG. 1 provides an example method for reconstructing geometric surfaces of an environment, even when dynamic objects are present in that environment.

Embodiments disclosed herein are related to systems and methods that reconstruct the geometric surfaces of an environment, even when that environment includes dynamic objects. As used herein, the term "dynamic" refers to objects that satisfy a certain degree of volatility such that they are characterized as being highly transitory, even if they do not move for a brief period of time. As used herein, the terms "dynamic," "transitory," or "moving" (when referencing an object) are interchangeable and reference an object that is not merely static relative to a particular environment. Examples of dynamic objects include, but are not limited to, humans, hands, animals, and sometimes vehicles, trains, or even planes. In contrast to dynamic objects, the term "static" refers to objects that do not satisfy the degree of volatility and are characterized as being relatively non-transitory relative to their environment, particularly during a period of time during which a depth map of the environment is generated, even if those objects are capable of moving and/or do move periodically. Examples of static objects include, but are not limited to, furniture, decorations, walls, appliances, tables, and chairs.

In some embodiments, after obtaining multiple depth maps that detail an environment from different angles or perspectives, a motion state identifier is assigned to each of at least some pixels in each of at least some of the depth maps. As used herein, a motion state identifier identifies whether a pixel is associated with a dynamic object or a static object located within the environment. Thereafter, subsequent to generating the depth maps, a composite 3D mesh is built by considering and/or adding pixel information (including depth information) to the 3D mesh for static objects while refraining from considering and/or adding pixel information (including depth information) to the 3D mesh for dynamic objects.

In some embodiments, after obtaining the multiple depth maps, a particular set of pixels is identified. These pixels satisfy certain predetermined motion criteria. Thereafter, the composite 3D mesh is generated by incorporating some pixel information from the depth maps while omitting some pixel information for the set of pixels that satisfied the motion criteria.

In this manner, significant improvements can be realized both in terms of reconstructing geometric surfaces as well as improvements to how a computer system operates. For example, the disclosed embodiments are (1) efficient because they pre-process information which is often less resource intensive than post-processing information, (2) robust because they do not erase content from an existing 3D mesh, and (3) adaptive because they allow for flexibility in the accuracy of depth images. Furthermore, the embodiments significantly reduce or even entirely eliminate blurring artifacts (e.g., ghosting) because information corresponding to dynamic objects is prevented from being added to the resulting 3D mesh. Such a methodology provides a more robust and accurate rendition of the geometric surfaces included within an environment. Such a methodology also improves the operational efficiency of the computer. For instance, as indicated above, the embodiments significantly reduce and/or eliminate the amount of post-processing that occurs by preemptively addressing dynamic objects using pre-process filtering. Often, pre-processing data consumes significantly fewer computing resources than post-processing data. As such, the embodiments improve the efficiency of a computer system.

Having just described some of the various high-level features and benefits of the disclosed embodiments, attention will first be directed to FIG. 1 which illustrates an example method for reconstructing geometric surfaces using multiple depth maps. Following that discussion, FIGS. 2A through 8 will be discussed which illustrate various environments and supporting illustrations related to geometric surface reconstruction. Following that discussion, the disclosure will turn to FIGS. 9 through 12. These figures present methods specifically related to assigning a motion state identifier to pixels. At the end, the disclosure will turn to FIG. 13, which presents an example computer system that may be used to facilitate the disclosed principles.

Improved Methodologies for Reconstructing Surface Geometries

Attention will now be directed to FIG. 1 which refers to a number of method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 1 shows a method 100 for reconstructing geometric surfaces included within an environment using a plurality of depth maps. Method 100 may be performed by one or more processors, application specific integrated circuits (ASICS), graphics processing units (GPU), or any other hardware logic units of a computer system, as will be described in more detail later in connection with FIG. 13. At this point, each of the method acts will be presented in a high-level, introductory manner. Following this high-level introduction, specific implementations and configurations will be presented with respect to the subsequent supporting figures.

Initially, a plurality of depth maps for an environment are obtained (act 105). At least some of these depth maps correspond to different perspectives or angles of the environment. A motion state identifier for at least some (or all) of the pixels in each of at least some (or all) of the depth maps is then assigned (act 110). Notably, a motion state identifier identifies whether a corresponding pixel is associated with a dynamic/moving object in the environment or, alternatively, with a static object in the environment.

Subsequent to building the plurality of depth maps, a composite 3D mesh then built (act 115). In some embodiments, the building of the 3D mesh occurs in real-time during the building of the depth maps, incrementally assembling different pixel data from the different depth maps.

Notably, the 3D mesh is based, at least partially, on different depth maps and is built by incorporating, into the composite 3D mesh, pixel information identified by the motion state identifiers as being associated with one or more static objects in the environment while omitting (or not considering) pixel information identified by the motion state identifiers as being associated with one or more moving objects in the environment in the composite 3D mesh. In this manner, the disclosed embodiments perform front-end filtering of pixel data associated with moving objects by determining which pixels correspond to moving objects and then preventing the information for those pixels from being used to generate (or be included in) the resulting 3D mesh.

Attention will now be directed to FIG. 2A which shows an example environment 200A that may include any number of static objects and/or moving objects. Within this environment 200A, there is a camera system 205A that is configured to obtain images of the environment 200A. These images are used to construct depth maps for the environment 200A and in particular for any objects located within the environment 200A. The camera system 205A may be a part of a mixed-reality system that includes a HMD. Furthermore, the camera system 205A may include any number and/or any type of camera. Additional details about the camera system 205A will be provided in connection with FIG. 13.

The camera system 205A is configured to generate image data for any content located within its field of view 210A. The x-y-z legend shows that the z-axis is projected outward from the camera system 205A in accordance with the camera system 205A's optical axis. As such, the z-axis represents the distance an object is from the camera system 205A (i.e. the depth). The x-axis and the y-axis are orthogonal to the z-axis.

Currently, the environment 200A includes an object 215A located within the field of view 210A. This object 215A includes multiple different surfaces, two of which are labeled, namely surface 220A and surface 225A. Although FIG. 2A shows that the environment 200A includes only a single object, it will be appreciated that the disclosed principles may be practiced in any type of environment and for any number of objects. For instance, the embodiments may be practiced in an outdoor environment or an indoor environment, and with any number of objects in those environments. Accordingly, the circumstances shown in these figures are for example purposes only and thus are non-limiting.

The camera system 205A is able to obtain one or more images of object 215A from a first perspective view, as shown by the position of the camera system 205A in relation to object 215A. In the scenario shown in FIG. 2A, this first perspective shows that the camera system 205A is aimed directly at surface 220A.

Figure 2B:
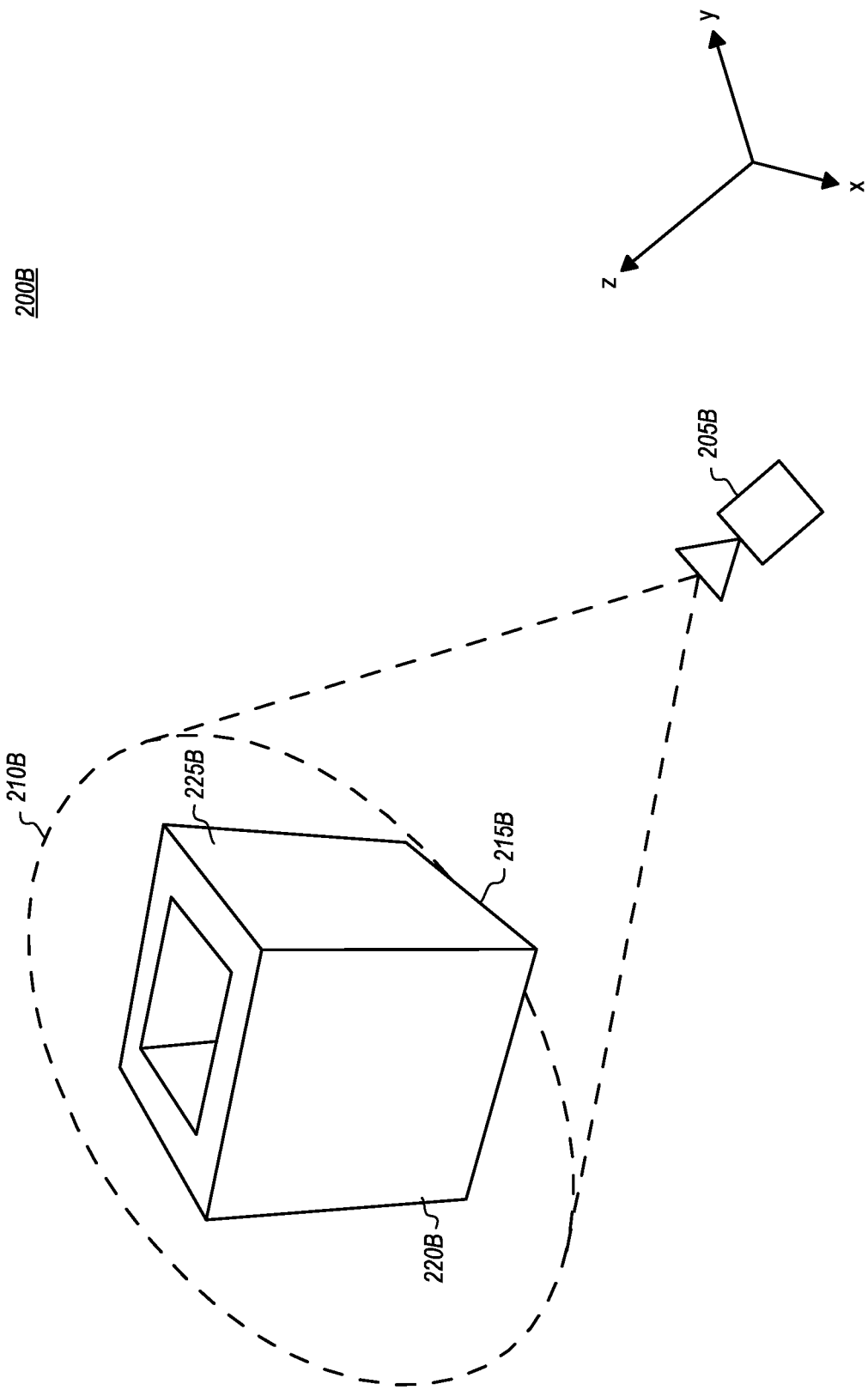

FIG. 2B shows environment 200B which is substantially the same as environment 200A from FIG. 2A. For instance, environment 200B includes camera system 205B, which is the same as camera system 205A from FIG. 2A but now moved to a new location. Furthermore, the field of view 210B and object 215B are also shown, similar to FIG. 2A. The object 215B includes surface 220B and 225B, which correspond to surface 220A and 225A respectively from FIG. 2A.

Now, the camera system 205B is aimed directionally towards object 215B from a different perspective. For instance, the x-y-z legend shows that the z-axis, which corresponds to the camera system 205B's optical axis, is now aimed more directly at the surface 225B (as opposed to surface 220A in FIG. 2A). In some instances, the camera system 205B is physically moved to view the environment 200B from the different perspective. In other instances, a re-projection process is executed to dynamically re-project the camera system 205B to a new location to obtain the new perspective view. Re-projection will be covered in more detail later in connection with FIG. 6. Accordingly, the camera system 205B is able to obtain images of the environment 200B from multiple different perspectives.

Figure 3:
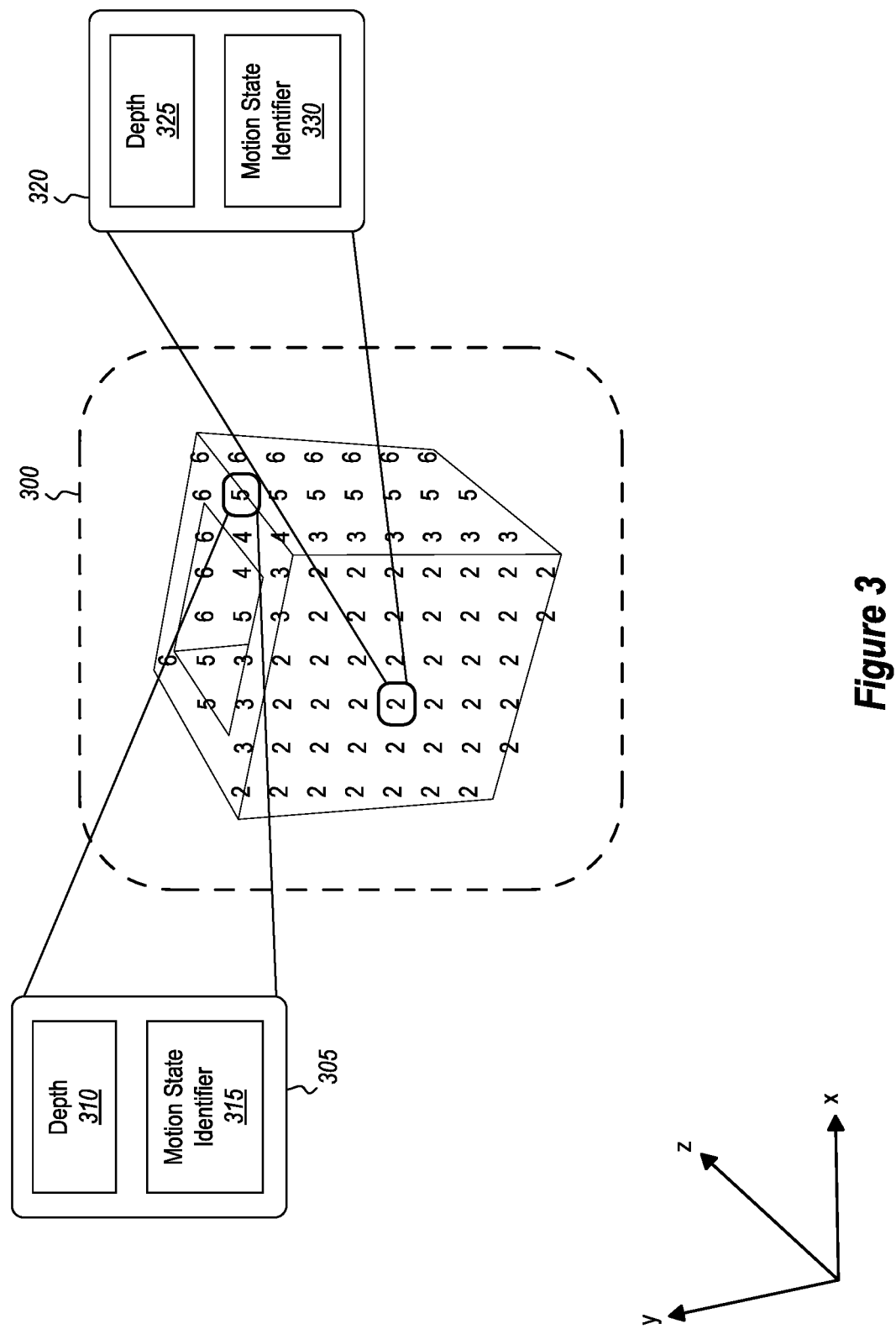
FIG. 3 illustrates an example depth map that is created based on one perspective view of the environment, as captured by the image from the camera system.

FIG. 3 shows a resulting depth map 300 that corresponds to the perspective shown in FIG. 2A. To clarify, the depth map 300 was generated using an image that was produced by camera system 205A which was facing directly at surface 220A of object 215A (as symbolically shown by the x-y-z legend shown in FIG. 3). As shown, the depth map 300 includes depth values (e.g., the values labeled as "2," "3," "4," "5," and "6"). These values are for example purposes only and are non-limiting. Because the surface 220A was closest to the camera system 205A at the time the image was generated, the depth map 300 shows that surface 220A (in FIG. 2A) was closer to the camera system 205A than the other surfaces (e.g., the value "2" represents the surface as being closest while the values "3," "4," "5," or "6" represent further distances/depths).

According to the disclosed embodiments, at least some (and sometimes all) of the pixels in the depth map 300 are individually assigned a depth value and a motion state identifier. For instance, pixel information 305 is shown as including a depth 310 and a motion state identifier 315. Similarly, pixel information 320 is shown as including a depth 325 and a motion state identifier 330. Although only pixel information 305 and 320 are described in detail, it will be appreciated that some (or all) of the pixels in the depth map 300 may be provided with a depth and a motion state identifier. As described earlier, a motion state identifier identifies whether a pixel corresponds to a dynamic/moving object or a static object. Further detail on how this identification/determination is made will be provided later. By preemptively making this determination, however, the embodiments are able to preclude information associated with moving objects from being added to the resulting 3D mesh. In this manner, the embodiments perform front-end filtering as opposed to back-end filtering.

Figure 4:
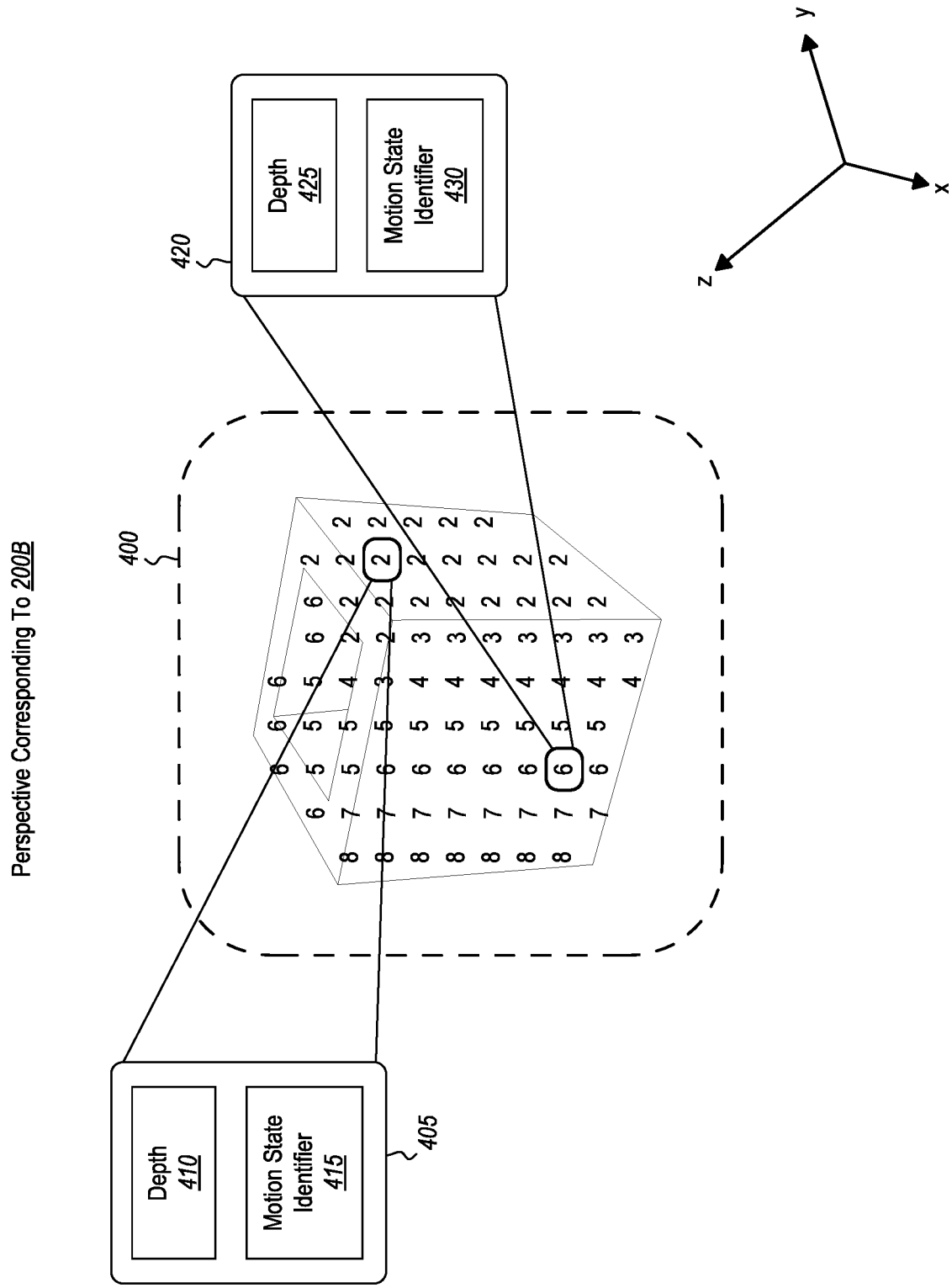
FIG. 4 illustrates another example depth map that is created based on a different perspective view of the environment.

FIG. 4 is similar to FIG. 3 in that it also shows a depth map 400, but this depth map 400 is from a different perspective than depth map 300 of FIG. 3. Specifically, depth map 400 corresponds to the perspective shown in FIG. 2B where the camera system 205B was aimed at surface 225B (as symbolically shown by the x-y-z legend in FIG. 4). Similar to FIG. 3, some (or all) of the pixels include various different information. For instance, pixel information 405 includes a depth 410 and a motion state identifier 415. Pixel information 420 includes a depth 425 and a motion state identifier 430. Because of the new location of the camera system 205B from FIG. 2B, the depth map 400 now shows that the surface 225B (in FIG. 2B) is closest to the camera system 205B (represented by the "2" values).

In this manner, multiple depth maps may be generated for an environment using images obtained by a camera system. Some (or all) of the pixels within some (or all) of these depth maps are individually assigned a depth value and a motion state identifier. Later, when at least some of these depth maps are fused together to produce a coherent 3D mesh, the motion state identifiers may be relied on to determine what pixel information will actually be used to build the 3D mesh. By preventing pixel information corresponding to moving objects from being added to the 3D mesh, the embodiments significantly reduce the amount of back-end processing that is required as well as reduce/eliminate undesired blurring effects because the moving objects that cause those effects are not included within the 3D mesh.

Figure 5:
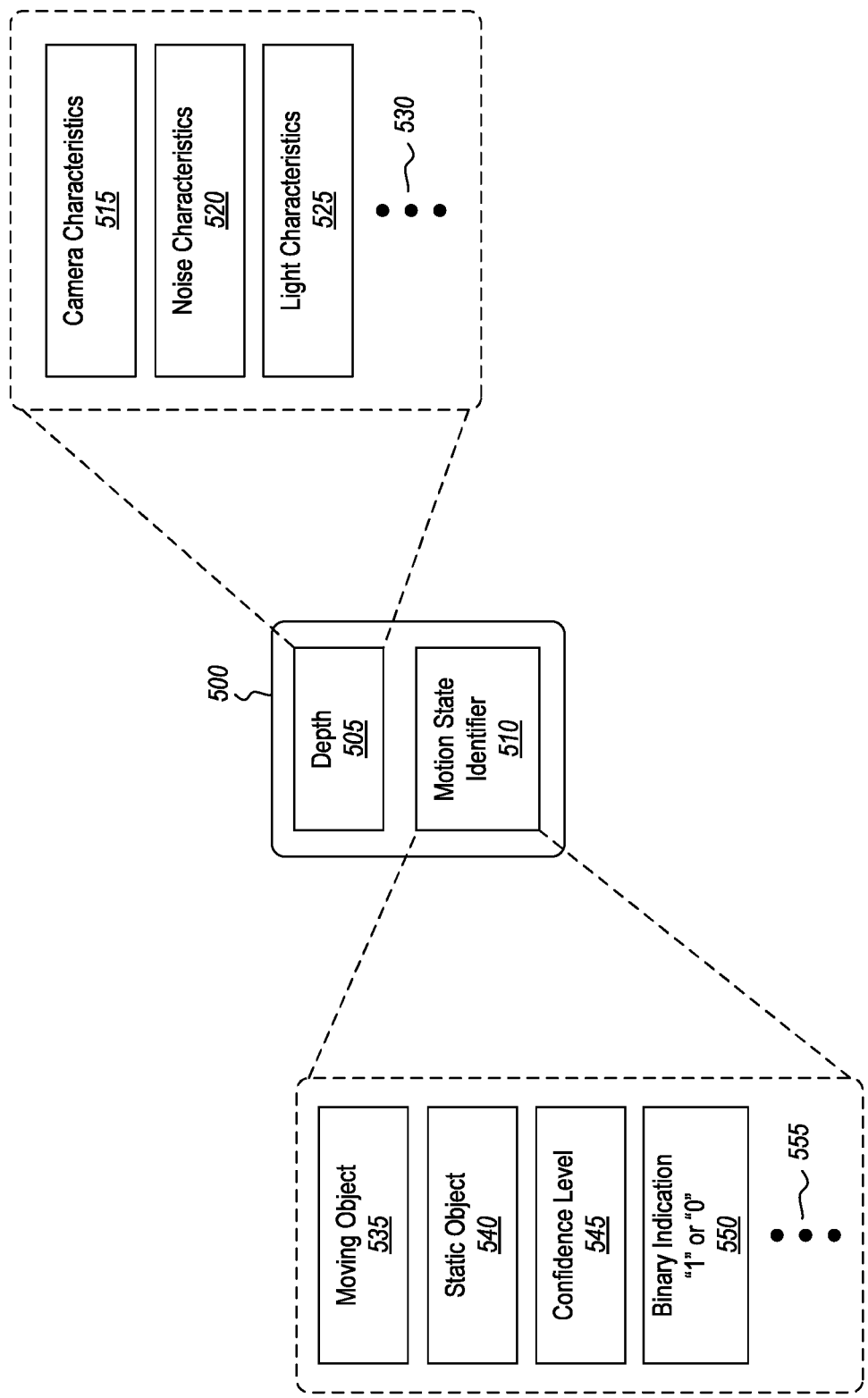
FIG. 5 shows some of the factors that are considered when generating the depth information for a pixel as well as some of the information that is included in a motion state identifier.

FIG. 5 provides more detail about pixel information 500 than that which was shown in FIGS. 3 and 4. Here, the pixel information 500 includes a depth 505 and a motion state identifier 510. Pixel information 500 is representative of pixel information 305 and 320 from FIG. 3 and pixel information 405 and 420 from FIG. 4. Pixel information 500 is included within a depth map, such as depth maps 300 and 400 from FIGS. 3 and 4 respectively. As such, any processes described for pixel information 500 may be performed for any of the other pixels in a depth map.

Determining the depth 505 (as well as the overall depth map) may be performed in a variety of ways. For instance, a depth camera may be used to generate the depth 505. Additionally, or alternatively, the depth 505 may be determined using a time-of-flight depth determination, structured light, active stereo matching or even passive stereo matching. Combinations of the above are also possible. For instance, one or more depth maps may be generated using a depth camera, one or more depth maps may be generated using active stereo matching, and one or more depth maps may be generated using passive stereo matching. Additionally, the pixel information 500 (and the corresponding depth map) may be generated from visible light image(s), infrared light image(s), or a combination of visible light and infrared light image(s). Further detail on the cameras used to capture these images is described in connection with FIG. 13.

When determining the depth 505, various other factors may be considered as well. For instance, the camera system's characteristics 515, any noise characteristics 520 (e.g., the camera's noise, noise in the environment, or any other noise), and light characteristics 525 may be considered when determining the depth 505. Ellipsis 530 demonstrates that other factors may also be considered when determining the depth 505, as well. In this manner, the depth 505 may be adjusted or otherwise compensated to reflect any number of these factors. Performing these compensations is beneficial because it may result in a more accurate depth determination.

According to the disclosed embodiments, the motion state identifier 510 is beneficially included or associated with the pixel information 500 in order to identify whether the corresponding pixel is associated with a moving object or a static object in the environment. To illustrate, the motion state identifier 510 includes fields to identify whether the corresponding pixel is a moving object 535 pixel or a static object 540 pixel.

In some embodiments, the motion state identifier 510 is a boolean value that, when set to one value, indicates that the corresponding pixel is a moving object 535 pixel and that, when set to the other value, indicates that the corresponding pixel is a static object 540 pixel. Some embodiments include a confidence level 545 to indicate a level of confidence regarding the decision as to whether the corresponding pixel is a moving object 535 pixel or a static object 540 pixel (i.e. it indicates a probability that the corresponding pixel is associated with a moving or static object). Details on how this decision is made will be discussed later in connection with FIGS. 9, 10, and 11. Accordingly, in some embodiments, each pixel's motion state identifier includes a boolean value and/or a confidence percentage value. To illustrate this Boolean value, FIG. 5 shows that the motion state identifier 510 may include a data field 550 which is a binary indication "1" or "0." It will be appreciated that this is an example only, and the embodiments are not limited strictly to a binary "1" or "0" to indicate a moving or a static object. Furthermore, the ellipsis 555 indicates that the motion state identifier 510 may include other information as well.

Previously, it was mentioned that the camera system is used to capture different perspectives of an environment. This may be achieved in a variety of ways. For instance, in some circumstances, the camera system is physically moved from one location to another in order to view the environment from a different perspective. This occurs quite often because, in many implementations, the camera system is part of an HMD that is being worn by a user. When the user moves, then the camera system is able to capture different perspectives.

Figure 6:
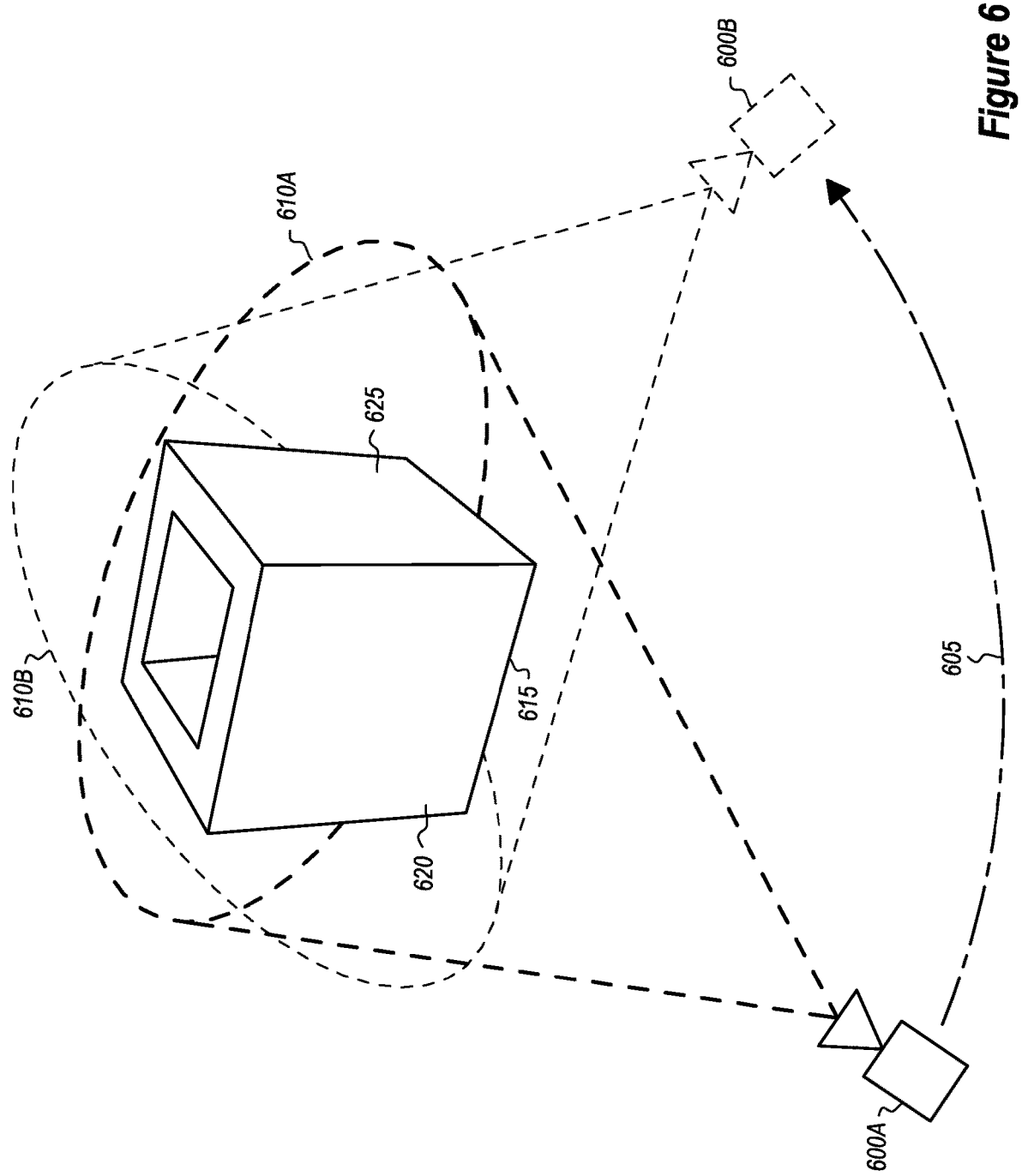
FIG. 6 shows that instead of physically moving the camera system to capture images from different perspectives, the camera system can be re-projected to a new location for the different perspective views.

FIG. 6 shows a different process for adjusting the perspective of the camera system. FIG. 6 shows a camera system 600A oriented in one position and a re-projected camera system 600B that has been re-projected 605 to a different position. By "re-projected," it is meant that various different software transformations are applied to the digital image captured by camera system 600A at its true physical position so that those digital images subsequently appear to have been taken by a camera system that was taken in a different position (specifically the position of re-projected camera system 600B). As such, re-projected camera system 600B is not a real camera system, rather, it is a dynamically-generated/simulated camera system.

Camera system 600A includes a field of view 610A while re-projected camera system 600B includes a different field of view 610B as a result of the transformations. Camera system 600A is aimed at an object 615, and in particular at the object 615's surface 620. In contrast, re-projected camera system 600B is aimed at the surface 625 of object 615. In this manner, instead of physically moving the camera system to obtain a different perspective view of an environment (and objects within that environment such as object 615), some embodiments re-project their camera systems to one or more different locations. It will be appreciated that some embodiments are also able to perform combinations of the above. For instance, some camera systems are physically moved to a new location and they are also re-projected to a new location to acquire images, which are used to generate depth maps based on the angles/perspectives of the environment.

Figure 7:
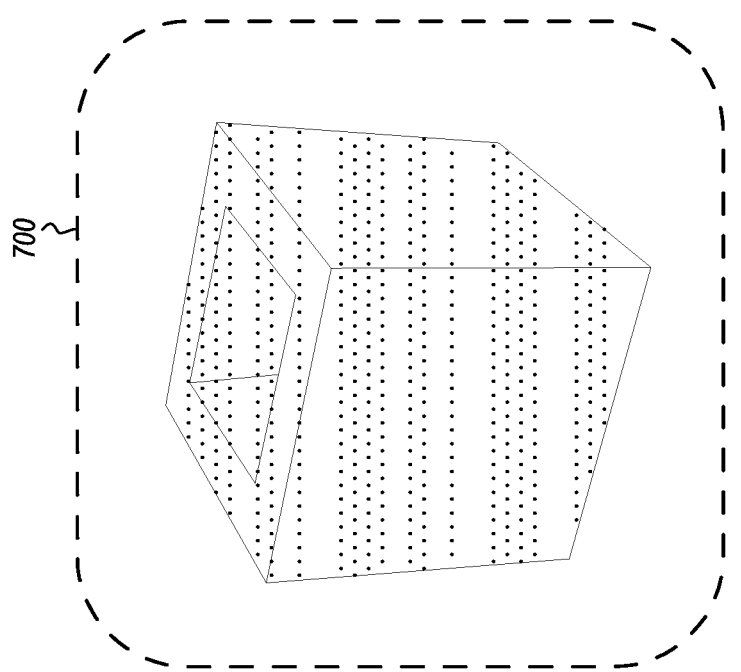
FIG. 7 shows that a depth map can be converted into a three dimensional (3D) point cloud.

In some embodiments, the resulting depth maps are used to generate a point cloud such as shown by the point cloud 700 in FIG. 7. Accordingly, in some implementations, building the overall composite 3D mesh is performed by converting one or more of the depth maps into one or more point clouds (e.g., point cloud 700) and then building the composite 3D mesh from the one or more point clouds.

Figure 8:
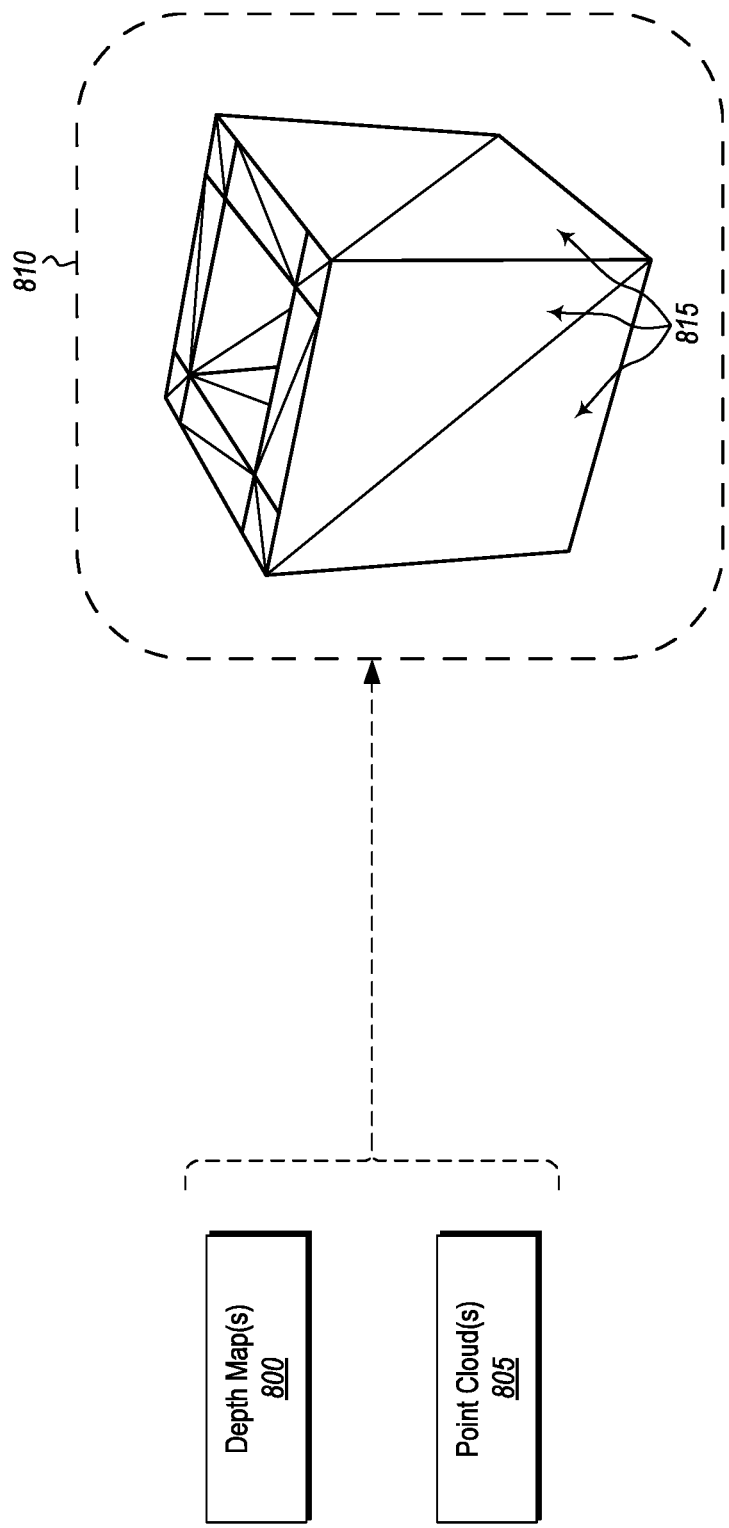
FIG. 8 shows that the depth maps and/or the 3D point clouds can be converted into a composite 3D mesh formed of interlocking triangles that represent the geometric surfaces of an object.
Figure 9:
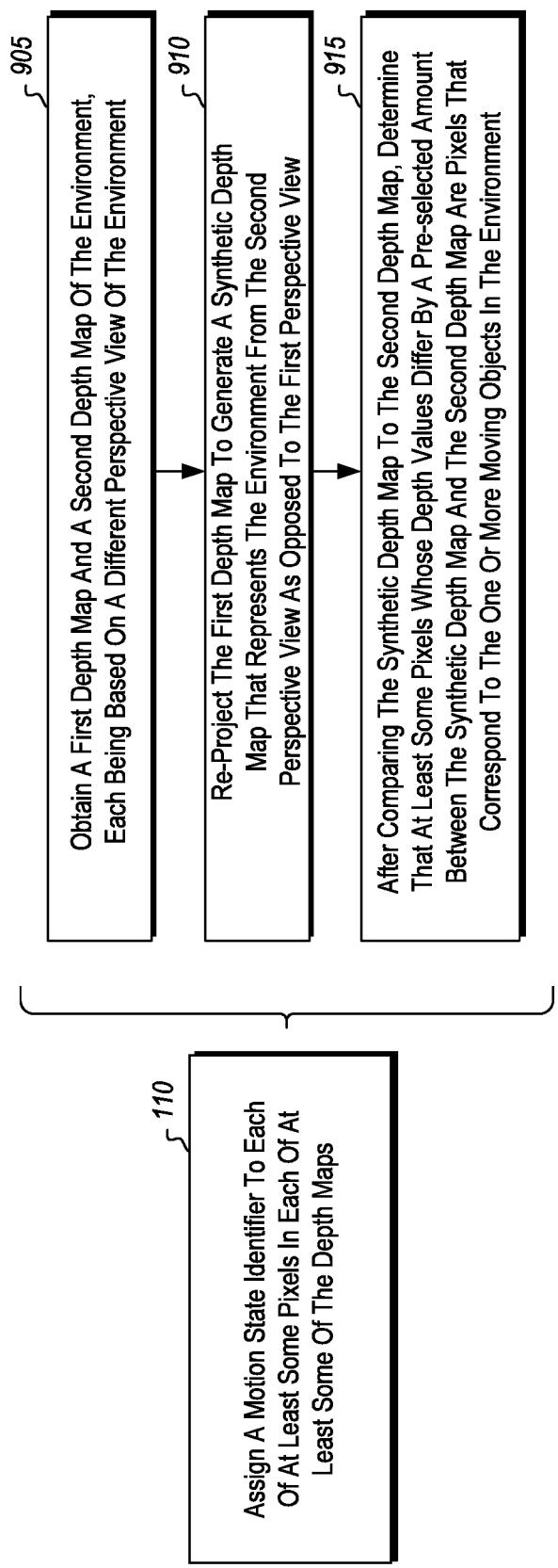
FIG. 9 illustrates one example process that may be followed when assigning motion state identifiers to pixels in a depth map.

Attention will now be directed to FIG. 8 which shows an example of a 3D mesh. Initially, FIG. 8 shows one or more depth maps 800 and one or more point clouds 805. Using the depth maps 800 and/or the point clouds 805, the embodiments are able to generate a composite 3D mesh 810 in the manner described in act 115 of FIG. 1. In some instances, composite 3D mesh 810 is composed of multiple geometric shapes, like triangles 815, that are interconnected to represent the geometric surfaces and the varying degrees in depth of the underlying object.

By altering the size and configuration of the triangles that form the composite 3D mesh 810, the triangles are able to accurately portray the geometric surfaces of any objects located within a particular environment. As described earlier, however, problems arise when reconstructing geometric surfaces of an environment that includes moving objects. Therefore, it is particularly beneficial to use the motion state identifiers to make a decision as to whether an object is moving or is stationary. By making this initial determination, then the embodiments are able to prevent the pixel information for moving objects from being included in the composite 3D mesh. In this manner, the embodiments perform front-end processing to filter out pixel information as opposed to back-end processing. Oftentimes, performing front-end processing significantly reduces the overall complexity of the computations that are performed as compared to back-end post-processing, such as the case in the "clean up later" approach.

The following sections will now describe various different methodologies that may be followed in determining the motion state identifier and whether an object is dynamic or static. It will be appreciated that any one or any combination of the following approaches may be followed. In the first approach, multiple depth maps are compared and contrasted to identify when an object is moving. In the second approach, machine learning is used to train the system to identify a moving object. In the third approach, objects are categorized and then sub-categorized to identify moving objects. Accordingly, in its most general form, the motion state identifier identifies all moving objects regardless of their object class and is used to filter out pixels from being considered for inclusion in the composite 3D mesh.

Compare and Contrast Depth Maps to Assign Motion State Identifiers

In the first approach, two consecutive depth images or maps are provided as input, and moving objects are identified by detecting discrepancies between the depth images. Such a process is outlined in FIG. 9 which initially shows the method act 110 from FIG. 1 in which a motion state identifier for each pixel is assigned.

Initially, a first and a second depth map of the environment are obtained (act 905). As was described earlier, each of these depth maps is based on a different perspective view of the environment, namely, a first and a second perspective view respectively. Furthermore, the first depth map is obtained at a point in time earlier than when the second depth map is obtained.

Next, the first depth map is re-projected to generate a synthetic depth map (act 910). Re-projecting the first depth map may be performed in a manner similar to that which was described earlier in connection with FIG. 6. This newly generated synthetic depth map represents the environment from the second perspective view as opposed to the first perspective view. In this regard, there are now two separate depth maps representing the environment from the second perspective view, namely, the re-projected synthetic depth map and the second depth map. Although the synthetic depth map and the second depth map represent the environment from the same perspective view, they do represent the environment at different points in time. As such, it is possible to compare these two depth maps to detect any movement that occurred between the time when the first depth map was generated (and which was used to create the synthetic depth map) and when the second depth map was generated.

After comparing the synthetic depth map to the second depth map, there is an act (act 915) of determining that at least some pixels whose depth values differ by a pre-selected amount between the synthetic depth map and the second depth map are pixels that correspond to the one or more moving objects in the environment. By measuring disparity (i.e. the differing amount) between the anticipated depth values (obtained via the synthetic depth map) and the actual depth values (obtained via the second depth map), it is possible to detect which objects were moving between the time that that first depth map was generated (and which was used to generate the synthetic depth map) and the time that the second depth map was generated.

As indicated above, only objects that moved by a pre-selected "buffer" amount will be classified as moving objects. By incorporating an allowable buffer amount to the disparity measurement, there is a lower likelihood that pixels will be incorrectly classified as dynamic. For instance, the pre-selected amount (i.e. the buffer) may be a threshold amount that is based, at least partially, on noise characteristics of the camera system that was used to generate the first depth map and/or the second depth map. By compensating for the noise in the camera system (or other types of factors, such as the factors detailed in FIG. 5), the embodiments are able to more accurately gauge whether an object is dynamic/moving or not.

In some embodiments, the process of re-projecting the first depth map to generate the synthetic depth map may also include generating (from the first depth map) a point cloud such as that shown in FIG. 7. After this point cloud is generated, then the point cloud (as opposed to the depth map) may be re-projected to a new pose having a perspective view that is substantially the same as the second perspective view of the environment. In this manner, the re-projected point cloud, which represents the environment in an estimated or anticipated state, can be compared against a subsequent depth map (or another subsequent point cloud) of the environment in its actual/real state.

By comparing the second depth map against a synthetic depth map, which was generated by projecting the first depth map into the pose of second camera image, moving objects can be detected. For instance, if no objects are moving in the environment, then the synthetic depth map will be very similar to the real, second depth map. Therefore, it is possible to accurately label pixels as moving if there is a sufficiently large difference (i.e. if the different satisfies a predetermined threshold difference) between the synthetic depth map and the real second depth map. The threshold can be set to any amount and may depend (though not necessarily) on the noise characteristics of the depth camera. Accordingly, this is one approach to determining whether an object is dynamic or static and for assigning a pixel's motion state identifier.

Use Machine Learning to Assign Motion State Identifiers

Some embodiments use deep learning to derive or determine whether an object is moving. To do so, end-to-end learning may be applied where a number of consecutive depth images and their poses serve as input to a machine learning algorithm (e.g., a neural network). The output of the machine learning algorithm is a label map (e.g., the motion state identifiers) detailing whether an object is moving or is static. Prior to this process, the machine learning algorithm is trained using a predetermined set of truth data so that the machine learning algorithm can later make its own determinations based on its training.

Figure 10:
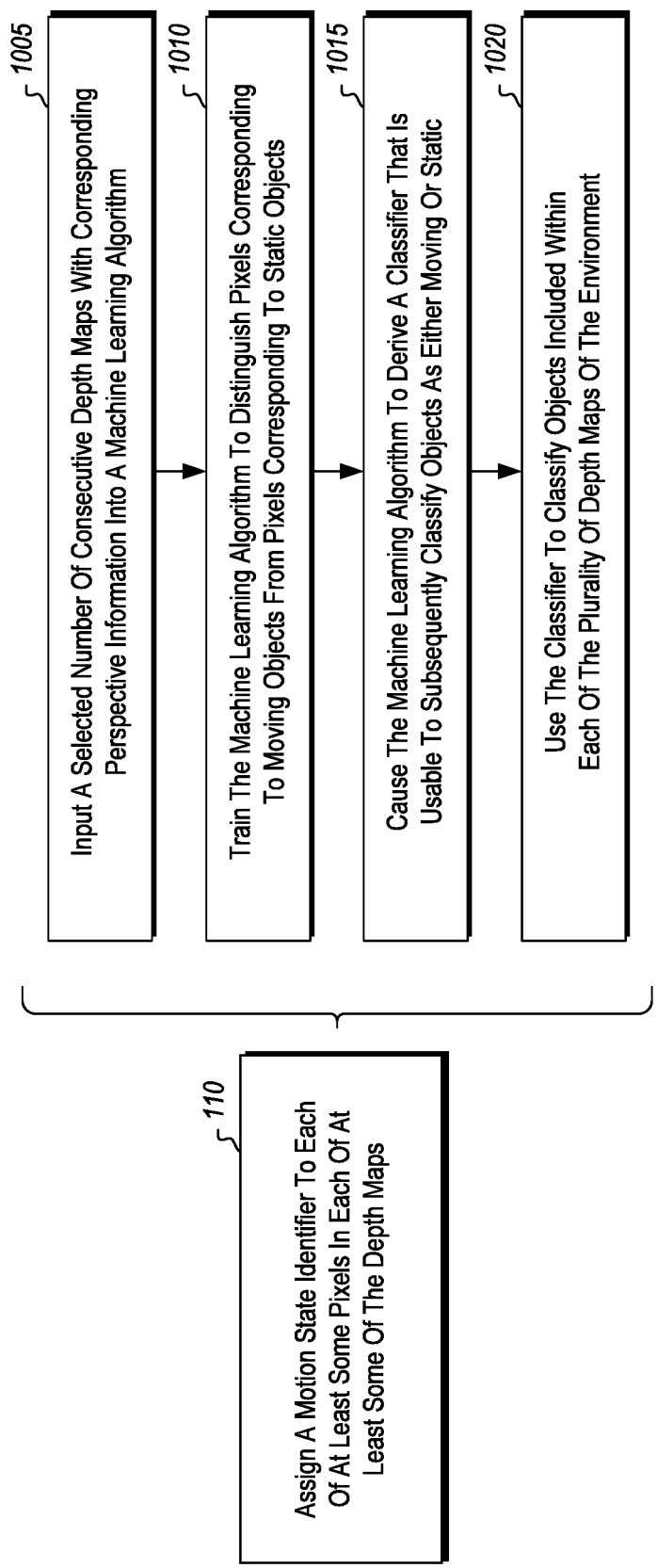
FIG. 10 illustrates another example process that may be followed when assigning motion state identified to pixels in a depth map.

With that said, attention will now be directed to FIG. 10 which illustrates a second approach to performing act 110 from FIG. 1 where motion state identifiers are assigned for each pixel in each of the depth maps. Initially, a selected number of consecutive depth maps (with corresponding perspective information) is selected to serve as input for a machine learning algorithm such as a neural network (act 1005).

Using this input, the machine learning algorithm is then trained (act 1010) to distinguish pixels corresponding to moving objects from pixels corresponding to static objects. Based on this training, the machine learning algorithm is then able to derive (act 1015) a classifier that is usable to subsequently classify objects as either moving or static. Thereafter, the classifier is used (act 1020) to classify objects included within each of the multiple depth maps of the environment. In this manner, machine learning (including deep learning and artificial intelligence) may be used to identify moving objects. Once identified, then any pixels corresponding to those moving objects may be flagged using their respective motion state identifiers. Information for these pixels is then prevented from being included in the resulting 3D mesh.

Categorizing Objects to Assign Motion State Identifiers

Sometimes highly dynamic objects, like people or animals, may stay still for relatively long periods of time. As such, it is often beneficial to derive an alternative labeling algorithm by taking advantage of the fact that certain classes of objects do typically move, even if they are stationary for a brief period of time. Examples of these classes include, but are not limited to, people, animals, and hands (e.g., of the user who is wearing the mixed-reality HMD).

Therefore, instead of directly detecting moving objects, as in the above approaches, it is possible to train a classifier to label pixels based on their determined object/class type. For example, pixels corresponding to a human (or animal or hand) may have their motion state identifiers be labeled as a moving object, even if the human is not immediately moving. In this manner, the human (or animal or hand) will not be included in the resulting mesh. Although only humans, animals, and hands were presented above, it will be appreciated that any type of highly transitory object may be categorized in a similar manner. Examples include, but are not limited to, vehicles, planes, trains, flags, or any other object that is sufficiently transitory. Therefore, at a high level, some embodiments initially obtain an image which is used to generate a depth map. Then, an object included within the first image is classified as a human, a hand, or an animal, etc. The motion state identifiers for any pixels corresponding to the human, the hand, or the animal are then adjusted so that those motion state identifiers reflect a moving object status.

Figure 11:
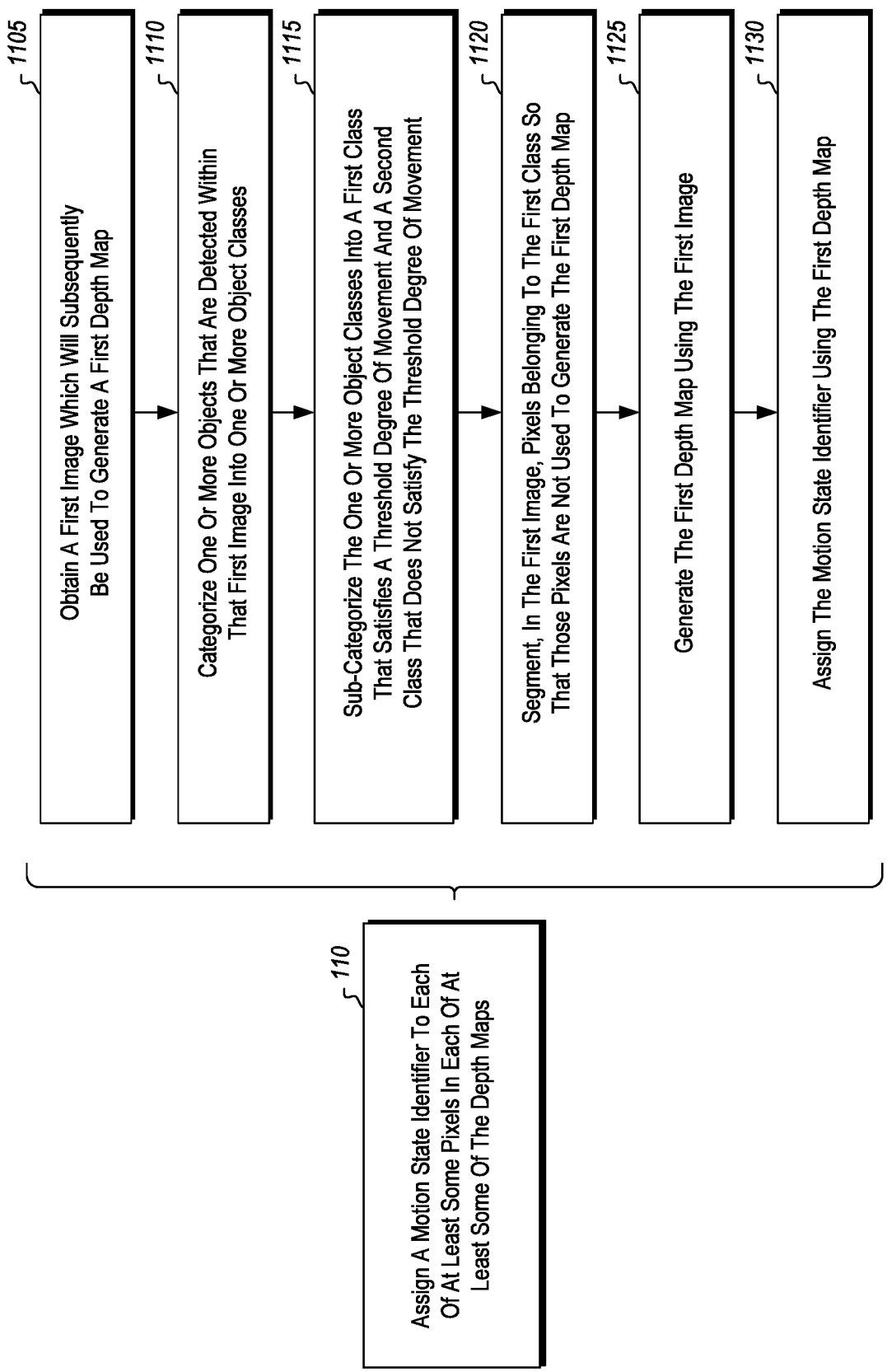
FIG. 11 illustrates yet another example process that may be followed when assigning motion state identifiers to pixels in a depth map.

With that in mind, attention will now be directed to FIG. 11 which shows yet another process associated with act 110 from FIG. 1 in which a motion state identifier may be assigned to each of the pixels. Initially, a first image, which will subsequently be used to generate a first depth map included within the plurality of depth maps, is obtained (act 1105). Then, one or more objects that are detected within that first image are categorized (act 1110) into one or more object classes. For instance, if the image is of an environment that includes a desk, a chair, a human, and a laptop, then there may be four different object classes, namely, a desk object class, a chair object class, a human object class, and a laptop object class. Object classes may be defined for any type of detectable object from within the image, regardless of their motion state (e.g., transitory state). In some embodiments, the objects are identified using machine learning to identify/segment each distinct object from one another.

Subsequently, these object classes are then sub-categorized (act 1115) into a first class that satisfies a threshold degree of movement and a second class that does not satisfy the threshold degree of movement. In this regard, the process of sub-categorizing objects causes each object to be labeled as either an object that typically moves (e.g., a human, animal, or hand) or an object that is typically static (e.g., a desk or desktop). The threshold degree of movement may be set to any value and is dynamically configurable.

Pixels belonging to the first class are then segmented (act 1120) so that those pixels are not used to generate the first depth map. The first depth map is then generated (act 1125) using the first image. Optionally, the motion state identifiers are assigned (act 1130) using the first depth map. This last step is optional because the objects have already been segmented in such a manner that the pixels corresponding to the moving objects will not be used to generate the first depth map. As a result, there might not be a need to further categorize the pixels using the motion state identifiers because only static objects were included in the resulting depth map. Accordingly, the embodiments provide significant advantages by pre-processing a digital image to characterize and distinguish moving objects from static objects.

In some embodiments, assigning the motion state identifier for each pixel also includes performing skeleton tracking to classify objects. As used herein, skeleton tracking is the process of recognizing how a human moves by identifying the positions of a human's joints and analyzing depth and movements based on how a human's joints are structure to bend.

Often, the process of segmenting objects is not perfect. For example, mistakes at depth boundaries might lead to depth silhouettes becoming part of the 3D mesh. One solution to improper segmenting is to extend and/or fatten segmentation areas which represent a moving object using morphological dilation. This ensures that an object's entire silhouette will be labeled as a moving object and hence will not become part of the mesh. As such, some embodiments implement a buffer region around each segmented object to ensure that the entirety of each object is adequately characterized as moving or as static. Of course, this buffer region may be any amount (e.g., the buffer region may extend an additional 2 pixels, or 3, 4, 5, 6, or any number of pixels). In this manner, the embodiments are able to assign motion state identifiers by determining whether an object is moving or is static.

Example Method for Reconstructing Geometric Surfaces

Figure 12:
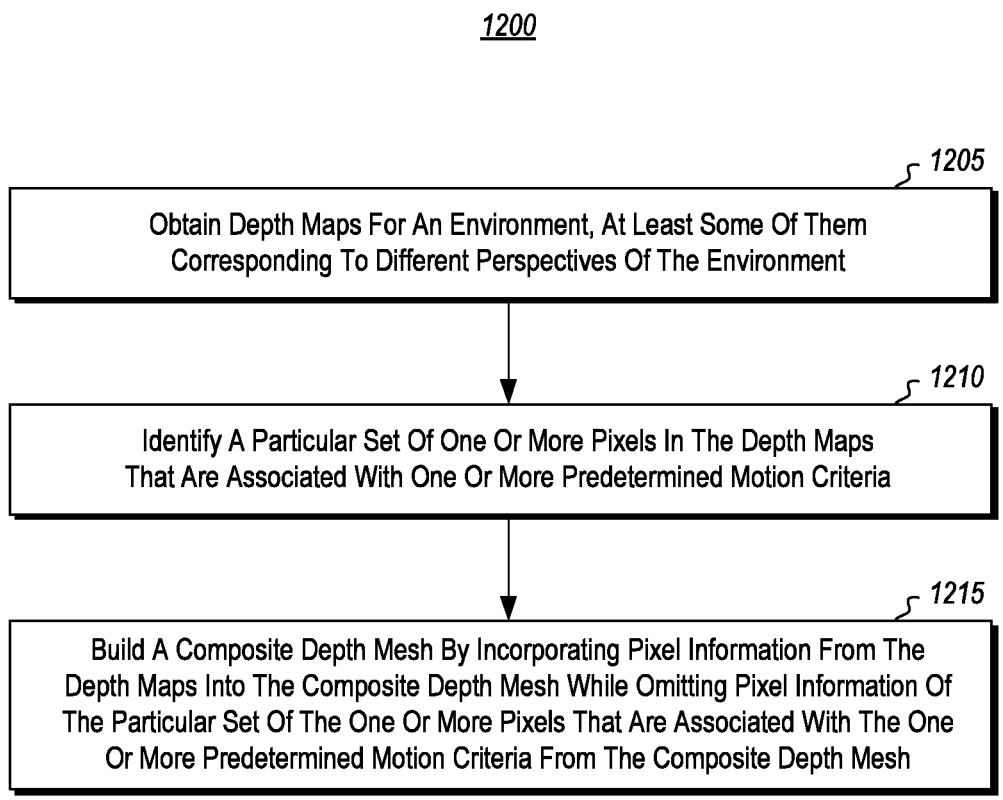
FIG. 12 demonstrates another method for reconstructing geometric surfaces of an environment, even when dynamic objects are present in that environment.

Attention will now be directed to FIG. 12 which illustrates another example method 1200 for reconstructing geometric surfaces included within an environment using a plurality of depth maps. Similar to method 100 from FIG. 1, method 1200 may be performed by one or more processors, ASICS, GPUs, or other hardware logic units of a computer system.

Initially, multiple depth maps for an environment are obtained (act 1205), where at least some of these depth maps correspond to different perspectives of the environment. Next, a particular set of one or more pixels in the plurality of depth maps are identified (act 1210) as being associated with one or more predetermined motion criteria. This motion criteria may be established using any of the processes described earlier. For example, the motion criteria may be a threshold amount of movement between consecutive depth images, it may be obtained through machine learning, or it may be obtained through a classification process. A composite 3D mesh is then built (act 1215) from the different depth maps. This is achieved by incorporating pixel information from the depth maps into the composite 3D mesh while also omitting pixel information of the particular set of the one or more pixels that are associated with the one or more predetermined motion criteria from the composite 3D mesh.

In most surface reconstruction applications, it is desirable to not have moving objects in the 3D mesh. However, some applications (e.g., collision chaperones or physics simulations) may want to have knowledge of the moving objects. In this case, instead of ignoring the information for certain pixels, it is possible to fuse them into a separate dynamic world, or rather, an entirely separate depth map. Each point/pixel in this separate map has an associated timestamp indicating when it was observed and includes an adjustable/settable expiration period, which may depend on the object's class. If the expiration period expires, then those points/pixels will be removed from the separate depth map. In this manner, these embodiments are able to maintain the information about the moving objects as well as the information about the static objects in the environment.

Accordingly, significant advantages are realized by pre-processing depth information to determine whether an object is moving or is stationary. By classifying objects as either static or moving, the embodiments are able to prevent a large amount of undesirable information from being added to the resulting 3D mesh. In this regard, the embodiments significantly reduce the amount of post-processing that is required. Furthermore, pre-processing is typically less expensive, computationally, than retroactively performing compensations or corrections, as is currently done in surface reconstruction. As such, the embodiments significantly improve the current technology.

Example Computer System

Figure 13:
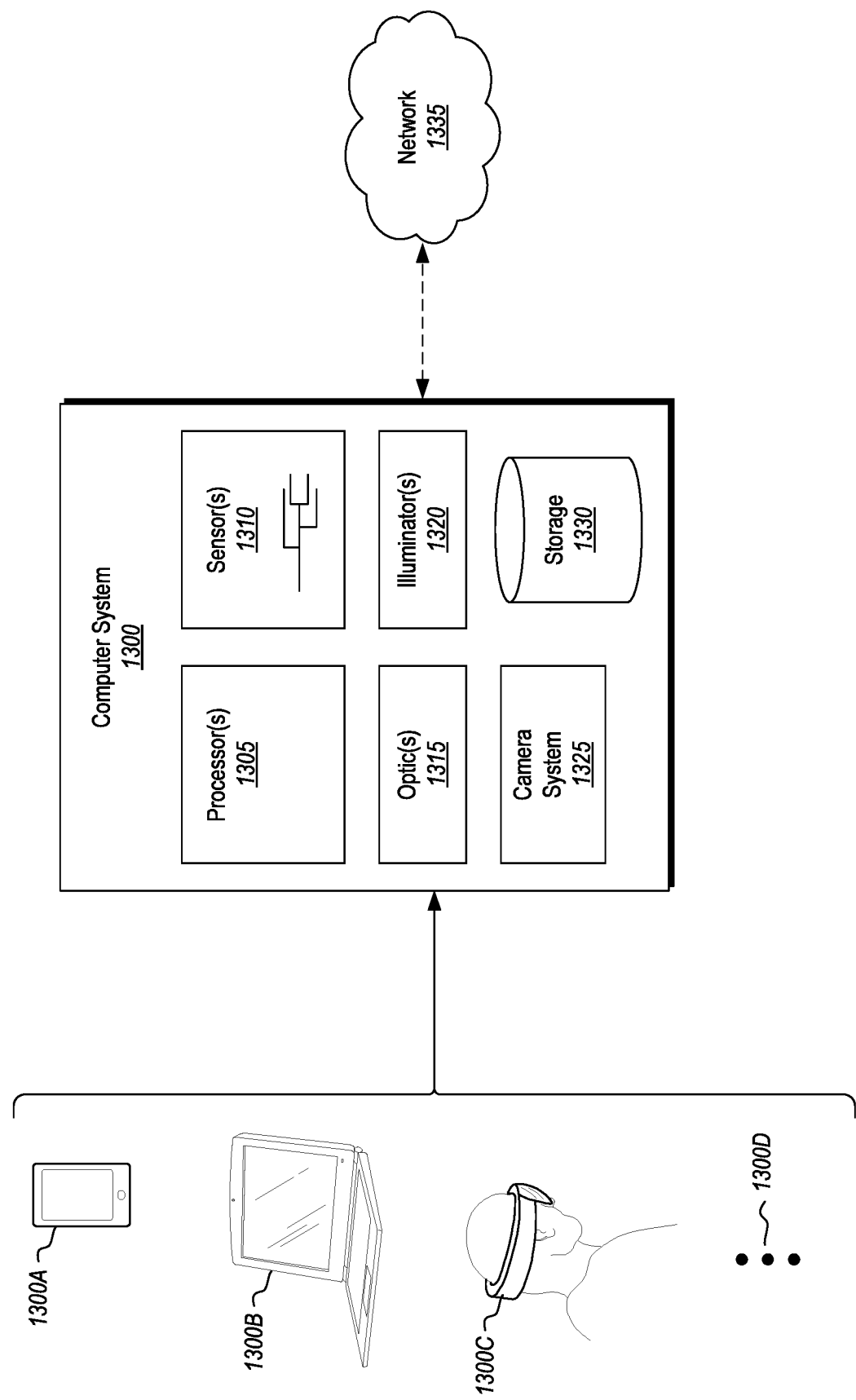
FIG. 13 shows an example computer system that may be used to perform the disclosed operations.

Having just described the various features and functionalities of some of the disclosed embodiments, the focus will now be directed to FIG. 13 which illustrates an example computer system 1300 that may be used to facilitate and/or incorporate the functionality disclosed herein.

Notably, the computer system 1300 may take various different forms. For example, in FIG. 13, the computer system 1300 may be embodied as a tablet 1300A, a desktop 1300B, or a HMD 1300C. Ellipsis 1300D demonstrates that the computer system 1300 may also be embodied in other forms, as well. For instance, the computer system 1300 may also be a distributed system, a laptop, a mobile phone, a server, a data center, and/or any other computing device.

In its most basic configuration, the computer system 1300 includes various different components. For example, FIG. 13 shows that computer system 1300 includes at least one processor 1305 (aka a "hardware processing unit"), sensors 1310, optics 1315, illuminators 1320, a camera system 1325, and storage 1330. The processor 1305 may be configured to perform any of the method acts that were described above. Although not shown, the computer system 1300 may include ASICs, GPUs, or other types of hardware logic units. Furthermore, the camera system 1325 may be used to obtain any of the images that are used to generate the depth maps. Further detail on the camera system 1325 is provided later.

The storage 1330 may be physical system memory, which may be volatile, non-volatile, or some combination of the two. The term "memory" may also be used herein to refer to non-volatile mass storage such as physical storage media. If the computer system 1300 is distributed, the processing, memory, and/or storage capability may be distributed as well. As used herein, the term "executable module,"

"executable component," or even "component" can refer to software objects, routines, or methods that may be executed on the computer system 1300. The different components, modules, engines, and services described herein may be implemented as objects or processors that execute on the computer system 1300 (e.g. as separate threads).

The disclosed embodiments may comprise or utilize a special-purpose or general-purpose computer including computer hardware, such as, for example, one or more processors (such the processor 1305) and system memory (such as storage 1330), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1300 may also be connected (via a wired or wireless connection) to external sensors (e.g., one or more remote cameras, accelerometers, gyroscopes, acoustic sensors, magnetometers, etc.). Further, the computer system 1300 may also be connected through one or more wired or wireless networks 1335 to remote systems(s) that are configured to perform any of the processing described with regard to computer system 1300.

During use, a user of the computer system 1300 is able to perceive information (e.g., a mixed-reality environment) through a display screen and that is visible to the user. The computer system 1300's input/output (I/O) interface(s) (not shown) and other sensors also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 1300 may also include a graphics rendering engine that is configured, with the processor 1305, to render one or more virtual objects within the scene. As a result, the virtual objects accurately move in response to a movement of the user and/or in response to user input as the user interacts within the virtual scene.

A "network," like the network 1335 shown in FIG. 13, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1300 will include one or more communication channels that are used to communicate with the network 1335. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 2105). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The disclosed embodiments provide various advantages over traditional HMD systems. Some of these advantages include providing a more robust and accurate geometric surface reconstruction for mixed-reality environments.

The illustrated optics 1315 include any kind of optics that are capable of being used in camera system 1325. For instance, the optics 1315 may include any number of lenses, diffractive optical elements, or collimating lenses.

The referenced illuminators 1320 include infrared (IR) light illuminators and/or visible light illuminators. The illuminators 1320 may provide structured light in the form of an IR dot pattern to provide additional texture to smooth or textureless surfaces. Additionally, or alternatively, the illuminators 1320 may provide a flood of IR light to illuminate a large span of area. The illuminators 1310 are beneficial, in some instances, for providing IR light during low visible light situations. Because the camera system 1325 is able to detect both visible and IR light, the computer system 1300 is operational in any kind of environment, even low light environments.

It will be appreciated that the camera system 1325 may include any number or any type of cameras. For instance, the camera system 1325 may include one or more depth cameras and/or one or more stereo matching camera pairs. As such, the camera system 1325 may include one, two, three, four, or more than four different cameras. The camera system 1325 may also be a time of flight system or a structured light depth camera system. Furthermore, the camera system 1325 may be a red, green, blue (RGB) camera system, an infrared (IR) light camera system, a monochromatic camera system and/or any combination of the foregoing.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to:
     obtain a plurality of depth maps for an environment, at least some of the plurality of depth maps corresponding to different perspectives of the environment and including depth determination factors for at least some pixels depicting the environment, the depth determination factors including at least one of camera characteristics, noise characteristics, or light characteristics;
     assign a motion state identifier for each pixel of the at least some pixels in each of the at least some of the plurality of depth maps, each of the motion state identifiers identifying whether each corresponding pixel is associated with a dynamic object in the environment or, alternatively, with a static object in the environment,
       wherein assigning the motion state identifiers is based on a comparison between at least some of the depth determination factors, and
       wherein assigning the motion state identifier for each of the at least some pixels in each of the at least some depth maps is performed by at least:
         obtaining a first depth map and a second depth map of the environment, wherein the first depth map is generated based on a first perspective view of the environment and the second depth map is generated based on a second, different perspective view of the environment, the second depth map being generated later in time relative to the first depth map;
         re-projecting the first depth map to generate a synthetic depth map that represents the environment from a re-projected perspective now corresponding to the second perspective; and
         after comparing the synthetic depth map to the second depth map, determining that at least some pixels whose depth values differ by a pre-selected amount between the synthetic depth map and the second depth map are pixels that correspond to one or more dynamic objects in the environment; and
     build a composite three dimensional (3D) mesh that is based on each of the at least some of the plurality of depth maps by incorporating, into the composite 3D mesh, pixel information identified by the motion state identifiers as being associated with one or more static objects in the environment while omitting, from the composite 3D mesh, the pixel information identified by the motion state identifiers as being associated with the one or more dynamic objects in the environment.

2. The computer system of claim 1, wherein the pre-selected amount is a threshold amount that is based, at least partially, on noise characteristics of a camera system that was used to obtain one or more images used to generate the first depth map and/or the second depth map.

3. The computer system of claim 1, wherein re-projecting the first depth map to generate the synthetic depth map includes generating, from the first depth map, a point cloud and re-projecting that point cloud to a pose having a perspective view that is substantially the same as the second perspective view of the environment.

4. The computer system of claim 1, wherein assigning the motion state identifier for each of the at least some pixels in each of the at least some depth maps is performed by at least the following:
   inputting a selected number of consecutive depth maps with corresponding perspective information into a machine learning algorithm;
   training the machine learning algorithm to distinguish pixels corresponding to dynamic objects from pixels corresponding to static objects;
   causing the machine learning algorithm to derive a classifier that is usable to subsequently classify objects as either dynamic or static; and
   using the classifier to classify objects included within each of the plurality of depth maps of the environment.

5. The computer system of claim 1, wherein assigning the motion state identifier for each of the at least some pixels in each of the at least some depth maps is performed by at least the following:
   obtaining a first image which will subsequently be used to generate a first depth map included within the plurality of depth maps;
   categorizing one or more objects that are detected within that first image into one or more object classes;
   sub-categorizing the one or more object classes into a first class that satisfies a threshold degree of movement and a second class that does not satisfy the threshold degree of movement;

segmenting, in the first image, pixels belonging to the first class so that those pixels are not used to generate the first depth map; and generating the first depth map using the first image.

6. The computer system of claim 1, wherein each pixel's motion state identifier is a boolean value.

7. The computer system of claim 1, wherein each pixel's motion state identifier includes a level of confidence indicating a probability that each corresponding pixel is associated with a corresponding dynamic or static object.

8. The computer system of claim 1, wherein assigning the motion state identifier for each of the at least some pixels in each of the at least some depth maps includes performing skeleton tracking to classify objects.

9. A method for reconstructing geometric surfaces included within an environment using a plurality of depth maps, the method being performed by a computer system and comprising the computer system performing the following:

obtaining a plurality of depth maps for an environment, at least some of the plurality of depth maps corresponding to different perspectives of the environment and including depth determination factors for at least some pixels depicting the environment, the depth determination factors including at least one of camera characteristics, noise characteristics, or light characteristics;

assigning a motion state identifier for each pixel of the at least some pixels in each of the at least some of the plurality of depth maps, each of the motion state identifiers identifying whether each corresponding pixel is associated with a dynamic object in the environment or, alternatively, with a static object in the environment, wherein assigning the motion state identifiers is based on a comparison between at least some of the depth determination factors; and wherein assigning the motion state identifier for each of the at least some pixels in each of the at least some depth maps is performed by at least:

obtaining a first depth map and a second depth map of the environment, wherein the first depth map is generated based on a first perspective view of the environment and the second depth map is generated based on a second, different perspective view of the environment, the second depth map being generated later in time relative to the first depth map;

re-projecting the first depth map to generate a synthetic depth map that represents the environment from a re-projected perspective now corresponding to the second perspective; and after comparing the synthetic depth map to the second depth map, determining that at least some pixels whose depth values differ by a pre-selected amount between the synthetic depth map and the second depth map are pixels that correspond to one or more dynamic objects in the environment; and building a composite three dimensional (3D) mesh that is based on each of the at least some of the plurality of depth maps by incorporating, into the composite 3D mesh, pixel information identified by the motion state identifiers as being associated with one or more static objects in the environment, while omitting, from the composite 3D mesh, the pixel information identified by the motion state identifiers as being associated with one or more dynamic objects in the environment.

10. The method of claim 9, wherein the plurality of depth maps is obtained using a depth camera.

11. The method of claim 9, wherein the plurality of depth maps is obtained using active stereo matching or a time-of-flight depth determination.

12. The method of claim 9, wherein the plurality of depth maps is obtained using passive stereo matching.

13. The method of claim 9, wherein humans, hands, and/or animals are classified as moving objects, and wherein the method further includes:

obtaining a first image which is used to generate a first depth map included within the plurality of depth maps;

classifying an object included within the first image as a human, a hand, or an animal; and adjusting motion state identifiers for any pixels corresponding to the human, the hand, or the animal so that those motion state identifiers reflect a moving object status.

14. The method of claim 9, wherein the plurality of depth maps is generated from visible light images, infrared light images, or a combination of visible light and infrared light images.

15. The method of claim 9, wherein each pixel's motion state identifier includes either a boolean value or a confidence percentage value.

16. The method of claim 9, wherein building the composite 3D mesh is performed by converting one or more of the plurality of depth maps into one or more point clouds and then building the composite 3D mesh from the one or more point clouds.

17. The method of claim 9, wherein assigning the motion state identifier for each pixel in each of the plurality of depth maps is performed by at least the following:

obtaining a first image which will subsequently be used to generate a first depth map included within the plurality of depth maps;

categorizing one or more objects that are detected within that first image into one or more object classes;

sub-categorizing the one or more object classes into a first class that satisfies a threshold degree of movement and a second class that does not satisfy the threshold degree of movement;

segmenting, in the first image, pixels belonging to the first class so that those pixels are not used to generate the first depth map;

generating the first depth map using the first image; and assigning the motion state identifier using the first depth map.

18. A method for reconstructing geometric surfaces included within an environment using a plurality of depth maps, the method being performed by a computer system and comprising the computer system performing the following:

obtaining a plurality of depth maps for an environment, at least some of the plurality of depth maps corresponding to different perspectives of the environment and including depth determination factors for at least some pixels depicting the environment, the depth determination factors including at least one of camera characteristics, noise characteristics, or light characteristics;

identifying a particular set of pixels in the plurality of depth maps, the set of pixels being associated with one or more predetermined motion criteria, wherein identifying the particular set of pixels is performed by at least:

obtaining a first depth map and a second depth map of the environment, wherein the first depth map is generated based on a first perspective view of the environment and the second depth map is generated based on a second, different perspective view of the environment, the second depth map being generated later in time relative to the first depth map;

re-projecting the first depth map to generate a synthetic depth map that represents the environment from a re-projected perspective now corresponding to the second perspective; and after comparing the synthetic depth map to the second depth map, determining that at least some pixels whose depth values differ by a pre-selected amount between the synthetic depth map and the second depth map are pixels that correspond to one or more dynamic objects in the environment and identifying the at least some pixels as being the particular set of pixels; and building a composite three dimensional (3D) mesh from the plurality of depth maps by incorporating pixel information from the plurality of depth maps, including the depth determination factors, into the composite 3D mesh, but while also omitting pixel information of the particular set of pixels that are associated with the one or more predetermined motion criteria from the composite 3D mesh.

* * * * *